US009014857B2

(12) United States Patent
Ota et al.

(10) Patent No.: US 9,014,857 B2
(45) Date of Patent: Apr. 21, 2015

(54) METHODS AND COMPUTER-PROGRAM PRODUCTS FOR GENERATING GRASP PATTERNS FOR USE BY A ROBOT

(75) Inventors: Yasuhiro Ota, Union, KY (US); Junggon Kim, Pittsburgh, PA (US); Kunihiro Iwamoto, Burlington, KY (US); James J. Kuffner, Mountain View, CA (US); Nancy S. Pollard, Pittsburgh, PA (US)

(73) Assignees: Toyota Motor Engineering & Manufacturing North America, Inc., Erlanger, KY (US); Carnegie Mellon University, Pittsburgh, PA (US)

( * ) Notice: Subject to any disclaimer, the term of this patent is extended or adjusted under 35 U.S.C. 154(b) by 546 days.

(21) Appl. No.: 13/350,162

(22) Filed: Jan. 13, 2012

(65) Prior Publication Data
US 2013/0184870 A1 Jul. 18, 2013

(51) Int. Cl.
*G05B 15/00* (2006.01)
*G05B 19/00* (2006.01)
*B25J 9/16* (2006.01)

(52) U.S. Cl.
CPC ..................... *B25J 9/1669* (2013.01)

(58) Field of Classification Search
CPC ............ B25J 9/10; B25J 9/16; B25J 9/1612; B25J 15/00; B25J 15/08; B25J 13/00; B25J 13/02; B25J 13/08
USPC ................................ 700/245–264
See application file for complete search history.

(56) References Cited

U.S. PATENT DOCUMENTS

| | | | |
|---|---|---|---|
| 3,985,238 A | 10/1976 | Nakura et al. | |
| 4,300,198 A | 11/1981 | Davini | |
| 4,308,584 A | 12/1981 | Arai et al. | |
| 4,530,636 A | 7/1985 | Inaba et al. | |
| 4,550,383 A | 10/1985 | Sugimoto | |
| 4,633,385 A | 12/1986 | Murata et al. | |
| 4,762,455 A | 8/1988 | Coughlan et al. | |
| 4,974,210 A | 11/1990 | Lee | |
| 4,980,626 A * | 12/1990 | Hess et al. | 318/568.16 |

(Continued)

OTHER PUBLICATIONS

Andrew T. Miller and Peter K. Allen, GraspIt! A Versatile Simulator for Robotic Grasping, IEEE Robotics & Automation Magazine, Dec. 2004.

(Continued)

*Primary Examiner* — Jason Holloway
*Assistant Examiner* — Rachid Bendidi
(74) *Attorney, Agent, or Firm* — Dinsmore & Shohl LLP (57) ABSTRACT

Methods and computer program products for generating robot grasp patterns are disclosed. In one embodiment, a method for generating robot grasp patterns includes generating a plurality of approach rays associated with a target object. Each approach ray of the plurality of approach rays extends perpendicularly from a surface of the target object. The method further includes generating at least one grasp pattern for each approach ray to generate a grasp pattern set of the target object, calculating a grasp quality score for each individual grasp pattern of the grasp pattern set, and comparing the grasp quality score of each individual grasp pattern with a grasp quality threshold. The method further includes selecting individual grasp patterns of the grasp pattern set having a grasp quality score that is greater than the grasp quality threshold, and providing the selected individual grasp patterns to the robot for on-line manipulation of the target object.

20 Claims, 9 Drawing Sheets

(56) References Cited

U.S. PATENT DOCUMENTS

| | | | |
|---|---|---|---|
| 4,990,838 A | 2/1991 | Kawato et al. | |
| 5,023,808 A | 6/1991 | Seraji | |
| 5,038,089 A | 8/1991 | Szakaly | |
| 5,325,468 A * | 6/1994 | Terasaki et al. | 700/262 |
| 5,336,982 A | 8/1994 | Backes | |
| 6,580,970 B2 | 6/2003 | Matsuda et al. | |
| 6,954,681 B2 | 10/2005 | Fisher et al. | |
| 6,969,965 B2 | 11/2005 | Takenaka et al. | |
| 7,155,316 B2 | 12/2006 | Sutherland et al. | |
| 7,211,978 B2 | 5/2007 | Chang et al. | |
| 7,245,975 B2 | 7/2007 | Mirza | |
| 7,386,365 B2 | 6/2008 | Nixon | |
| 7,558,647 B2 * | 7/2009 | Okazaki | 700/260 |
| 7,571,025 B2 | 8/2009 | Bischoff | |
| 7,592,768 B2 | 9/2009 | Shirai et al. | |
| 7,751,938 B2 * | 7/2010 | Tsusaka et al. | 700/250 |
| 7,774,099 B2 | 8/2010 | Kobayashi et al. | |
| 7,848,851 B2 * | 12/2010 | Nishi et al. | 700/264 |
| 7,984,658 B2 * | 7/2011 | Kishida et al. | 73/862.391 |
| 8,244,402 B2 * | 8/2012 | Wells et al. | 700/250 |
| 2006/0012198 A1 * | 1/2006 | Hager et al. | 294/106 |
| 2008/0075561 A1 | 3/2008 | Takemura et al. | |
| 2008/0249663 A1 | 10/2008 | Aoyama | |
| 2009/0069942 A1 * | 3/2009 | Takahashi | 700/260 |
| 2009/0076657 A1 * | 3/2009 | Tsuboi et al. | 700/275 |
| 2009/0148035 A1 | 6/2009 | Ohno et al. | |
| 2010/0256818 A1 * | 10/2010 | Aoba et al. | 700/275 |
| 2011/0093119 A1 | 4/2011 | Park et al. | |
| 2011/0153076 A1 | 6/2011 | Noro | |
| 2011/0238213 A1 * | 9/2011 | Nagasaka et al. | 700/253 |
| 2013/0184870 A1 * | 7/2013 | Ota et al. | 700/262 |

OTHER PUBLICATIONS

Corey Goldfeder, Matei Ciocarlie, Hao Dang and Peter K. Allen, The Columbia Grasp Database, authors are with the Dept. of Computer Science, Columbia University, NY, USA.

Kaijen Hsiao, Matei Ciocarlie, and Peter Brook, Bayesian Grasp Planning, Willow Garage Inc., Menlo Park, CA.

* cited by examiner

METHODS AND COMPUTER-PROGRAM PRODUCTS FOR GENERATING GRASP PATTERNS FOR USE BY A ROBOT

TECHNICAL FIELD

The present disclosure generally relates to grasp planning in robot applications and, more particularly, to methods and computer-program products for generating robot grasp patterns using a plurality of approach rays associated with a target object.

BACKGROUND

Robots may operate within a space to perform particular tasks. For example, servant robots may be tasked with navigating within an operational space, locating objects, and manipulating objects. A robot may be commanded to find an object within the operating space, pick up the object, and move the object to a different location within the operating space. Robots are often programmed to manipulate objects quickly and in a most efficient way possible.

However, calculating an appropriate grasp posture autonomously is difficult and computationally expensive. For each grasp candidate, the grasp quality must be tested to determine how well the grasp can securely hold a target object. Not all grasp patterns will yield a successful grasp of the target object. For example, the grasp pattern may cause the joints of the robot end effector to collide with the target object, or the grip provided by the grasp pattern will not be able to hold the target object. Further, a valid arm trajectory must be performed simultaneously within the trajectory planning. Such computations may slow down the on-line processes of a robot. In some cases, grasp patterns associated with a target object may also be taught by tedious manual programming or tele-operation of the robot. This process is slow and prone to human error.

Additionally, uncertainty may exist during robotic manipulation of a target object. For example, there may be uncertainty as to a target object's initial pose resulting from the robot's object localization system. Such uncertainty may lead to a grasp failure. Uncertainty may also exist as to object displacement and pose resulting from the dynamics of grasping and lifting a target object with an end effector of a robot.

Accordingly, a need exists for alternative methods and computer-program products for generating successful robot grasp patterns that are developed off-line with respect to robot processes and take into consideration target object pose and displacement uncertainties.

SUMMARY

In one embodiment, a method for generating grasp patterns for use by a robot includes generating a plurality of approach rays associated with a target object, wherein each approach ray of the plurality of approach rays extends perpendicularly from a surface of the target object. The method further includes generating at least one grasp pattern for each approach ray of the plurality of approach rays to generate a grasp pattern set of the target object associated with the plurality of approach rays, calculating a grasp quality score for each individual grasp pattern of the grasp pattern set, and comparing the grasp quality score of each individual grasp pattern with a grasp quality threshold. The method further includes selecting individual grasp patterns of the grasp pattern set having a grasp quality score that is greater than the grasp quality threshold, and providing the selected individual grasp patterns to the robot for on-line manipulation of the target object.

In another embodiment, a computer program product for use with a computing device to generate robot grasp patterns for a robot includes a computer-readable medium that stores computer-executable instructions for generating robot grasp patterns. When executed by a computing device, the computer-executable instructions cause the computing device to, by computer simulation, generate a plurality of approach rays associated with a target object, wherein each approach ray of the plurality of approach rays extends perpendicularly from a surface of the target object, generate at least one grasp pattern for each approach ray of the plurality of approach rays to generate a grasp pattern set of the target object associated with the plurality of approach rays, and calculate a grasp quality score for each individual grasp pattern of the grasp pattern set. The computer-executable instructions further cause the computing device to compare the grasp quality score of each individual grasp pattern with a grasp quality threshold, select individual grasp patterns of the grasp pattern set having a grasp quality score that is greater than the grasp quality threshold, and provide the selected individual grasp patterns to the robot for on-line manipulation of the target object.

In yet another embodiment, a method for generating grasp patterns for use by a robot includes generating a plurality of approach rays associated with a target object and generating at least one grasp pattern for each approach ray of the plurality of approach rays to generate a grasp pattern set of the target object associated with the plurality of approach rays. Each approach ray of the plurality of approach rays extends perpendicularly from a surface of the target object. Each individual grasp pattern is generated at least in part by selecting a plurality of object poses for the target object from a pose probability distribution model. The method includes, for each selected object pose, grasping the target object with the finger joints of the robot hand by computer simulation, lifting the target object with the robot hand, determining a number of finger joints in contact with the target object after lifting the target object with the robot hand, determining a displacement of the target object with respect to the robot hand after lifting the target object with the robot hand, and determining a contact force between the finger joints of the robot hand and the target object. The method further includes calculating a preliminary grasp quality score for each individual object pose of the plurality of object poses, wherein the preliminary grasp quality score is based at least in part on the displacement of the target object with respect to the robot hand after lifting the target object with the robot hand and the contact force between the finger joints of the robot hand and the target object. A grasp quality score for each individual grasp pattern of the grasp pattern set may be calculated by averaging the preliminary grasp quality score of the plurality of object poses associated with each individual grasp pattern. The method further includes comparing the grasp quality score of each individual grasp pattern with a grasp quality threshold, selecting individual grasp patterns of the grasp pattern set having a grasp quality score that is greater than the grasp quality threshold, and providing the selected individual grasp patterns to the robot for on-line manipulation of the target object.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments of the present disclosure are directed to methods and computer program products for generating and filtering a grasp pattern set to develop successful individual grasp patterns for online consideration and use by a robot. More particularly, embodiments described herein reduce on-line computations by the robot in manipulating target objects by evaluating a plurality of grasp patterns associated with a variety of objects, and then providing only those grasp patterns satisfying particular criteria to the robot for the robot's consideration during on-line operation. Embodiments generate a plurality of approach rays for a target object that correspond to a plurality of possible directions that the manipulator may travel to approach and grasp the target object. Embodiments may also take into consideration uncertainties when evaluating the individual grasp patterns of the grasp pattern set, such as object pose uncertainty, and object displacement uncertainty during object manipulation. Various embodiments of methods and computer-program products for off-line generation and evaluation of robot grasp patterns are described below.

Figure 1:
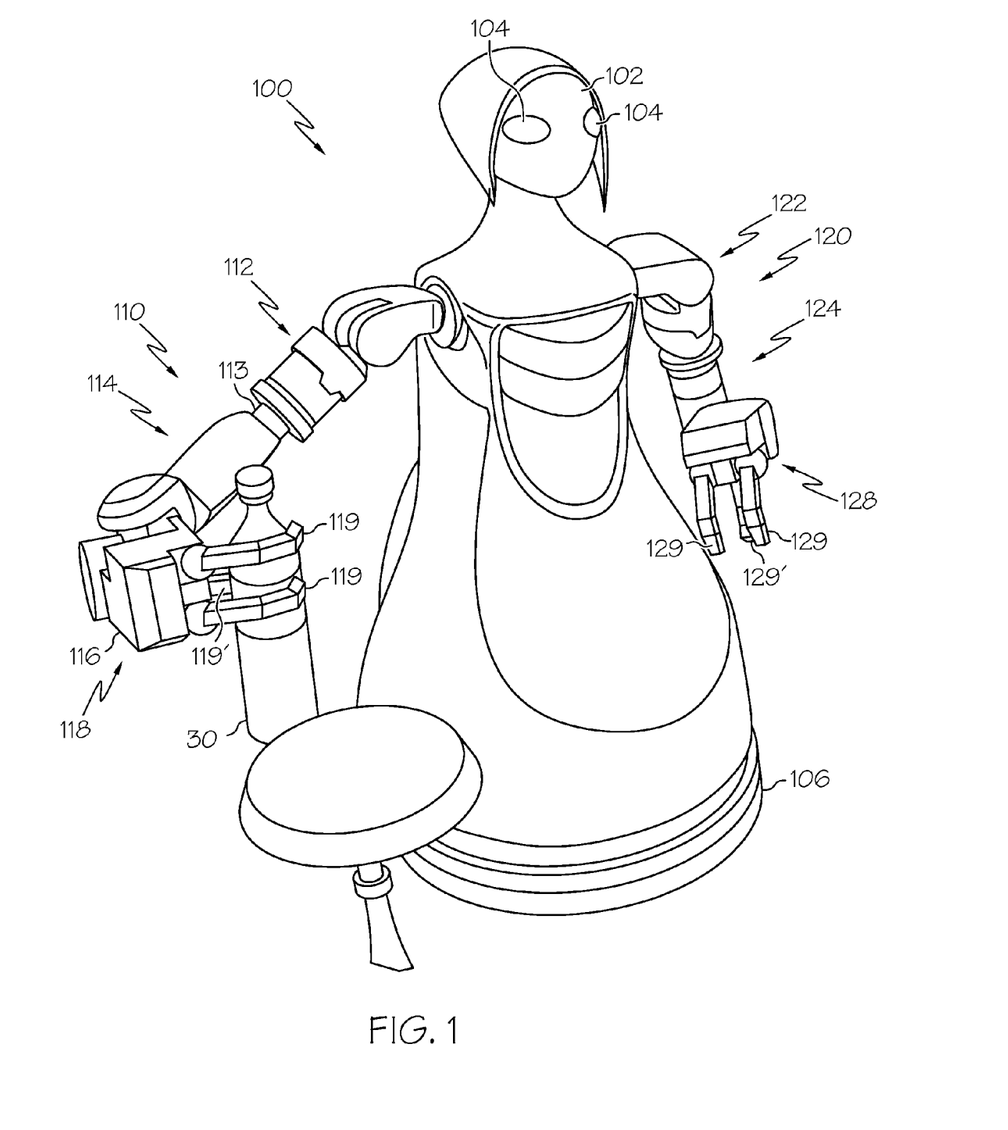
FIG. 1 depicts a schematic illustration of an exemplary robot manipulating a target object.

Referring initially to FIG. 1, a robot 100 according to one exemplary embodiment is illustrated. It should be understood that the robot 100 illustrated in FIG. 1 is for illustrative purposes only, and that embodiments are not limited to any particular robot configuration. The robot 100 has a humanoid appearance and is configured to operate as a service robot. For example, the robot 100 may operate to assist users in the home, in a nursing care facility, in a healthcare facility, and the like. Generally, the robot 100 comprises a head 102 with two cameras 104 that are configured to look like eyes, a locomotive base portion 106 for moving about in an operational space, a first manipulator 110, and a second manipulator 120. The first and second manipulators 110, 120 each comprise an upper arm component 112, 122, a forearm component 114, 124, and a robot hand 118, 128 (i.e., an end effector), respectively. The robot hand 118, 128 may comprise a robot hand comprising a hand portion 116, 126, a plurality of fingers joints 119, 129, and a thumb joint 119', 129' that may be opened and closed to manipulate a target object, such as a bottle 130. The upper arm component 112, 122, the forearm component 114, 124, and robot hand 118, 128 are each a particular component type of the first and second manipulator.

The robot 100 may be programmed to operate autonomously or semi-autonomously within an operational space, such as a home. In one embodiment, the robot 100 is programmed to autonomously complete tasks within the home throughout the day, while receiving audible (or electronic) commands from the user. For example, the user may speak a command to the robot 100, such as "please bring me the bottle on the table." The robot 100 may then go to the bottle 130 and complete the task. In another embodiment, the robot 100 is controlled directly by the user by a human-machine interface, such as a computer. The user may direct the robot 100 by remote control to accomplish particular tasks. For example, the user may control the robot 100 to approach a bottle 130 positioned on a table 132. The user may then instruct the robot 100 to pick up the bottle 130. The robot 100 may then develop a trajectory plan for its first and second manipulators 110, 120 to complete the task. As described in more detail below, embodiments are directed to creating trajectory plans that are optimized to provide for more human-like motion of the robot.

Figure 2:
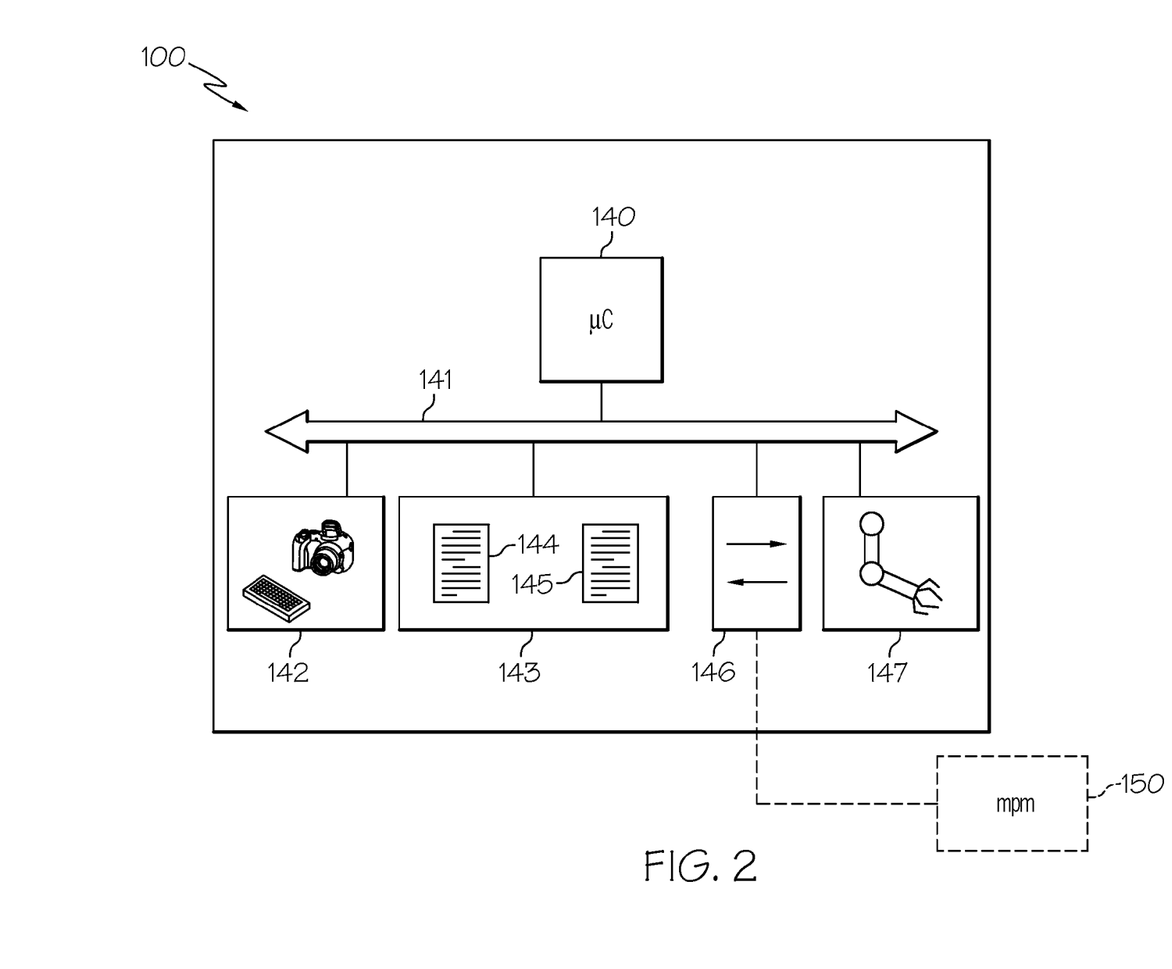
FIG. 2 depicts a schematic illustration of additional exemplary components of an exemplary robot according to one or more embodiments shown and described herein.

Referring now to FIG. 2, additional components of an exemplary robot 100 are illustrated. More particularly, FIG. 3 depicts a robot 100 and a manipulation planning module 150 (embodied as a separate computing device, an internal component of the robot 100, and/or a computer-program product comprising non-transitory computer-readable medium) for generating and evaluating grasp patterns for use by the robot 100 embodied as hardware, software, and/or firmware, according to embodiments shown and described herein. It is noted that the computer-program products and methods for generating and evaluating individual grasp patterns of a grasp pattern set may be executed by a computing device that is external to the robot 100 in some embodiments. For example, a general purpose computer (not shown) may have computer-executable instructions for evaluating individual grasp patterns. The grasp patterns that satisfy requirements of the grasp pattern evaluation may then be sent to the robot 100.

The robot 100 illustrated in FIG. 3 comprises a processor 140, input/output hardware 142, a non-transitory computer-readable medium 143 (which may store robot data/logic 144, and trajectory logic 145, for example), network interface hardware 146, and actuator drive hardware 147 to actuate the robot's manipulators (e.g., servo drive hardware). It is noted that the actuator drive hardware 147 may also include associated software to control the various actuators of the robot.

The memory component 143 may be configured as volatile and/or nonvolatile computer readable medium and, as such, may include random access memory (including SRAM, DRAM, and/or other types of random access memory), flash memory, registers, compact discs (CD), digital versatile discs (DVD), magnetic disks, and/or other types of storage components. Additionally, the memory component 143 may be configured to store, among other things, robot data/logic 144 and trajectory logic 145 (e.g., an inverse kinematic module, a pick and place planner, a collision checker, etc.). A local interface 141 is also included in FIG. 3 and may be implemented as a bus or other interface to facilitate communication among the components of the robot 100 or the computing device.

The processor 140 may include any processing component configured to receive and execute instructions (such as from the memory component 143). The input/output hardware 142 may include any hardware and/or software for providing input to the robot 100 (or computing device), such as, without limitation, a keyboard, mouse, camera, microphone, speaker, touch-screen, and/or other device for receiving, sending, and/or presenting data. The network interface hardware 146 may include any wired or wireless networking hardware, such as a modem, LAN port, wireless fidelity (Wi-Fi) card, WiMax card, mobile communications hardware, and/or other hardware for communicating with other networks and/or devices.

It should be understood that the memory component 143 may reside local to and/or remote from the robot 100 and may be configured to store one or more pieces of data for access by the robot 100 and/or other components. It should also be understood that the components illustrated in FIG. 3 are merely exemplary and are not intended to limit the scope of this disclosure. More specifically, while the components in FIG. 3 are illustrated as residing within the robot 100, this is a nonlimiting example. In some embodiments, one or more of the components may reside external to the robot 100, such as within a computing device that is communicatively coupled to one or more robots.

FIG. 2 also depicts a manipulation planning module 150 that is configured to generate a grasp pattern set, filter unsuccessful grasp patterns from the grasp pattern set, and, in some embodiments, develop manipulator and end effector motion segments to move the robot in accordance with desirable grasp patterns from the grasp pattern set. The manipulation planning module 150 is shown as external from the robot 100 in FIG. 2, and may reside in an external computing device, such as a general purpose or application specific computer. However, it should be understood that all, some, or none of the components, either software or hardware, of the manipulation planning module 150 may be provided within the robot 100. In one embodiment, grasp pattern generation, evaluation and filtering may be performed off-line and remotely from the robot 100 by a computing device such that only grasp patterns satisfying the requirements of the grasp pattern filters described herein are provided to the robot for use in manipulation planning. Further, motion planning within the manipulation planning module may also be performed off-line by an external computing device and provided to the robot 100. Alternatively, the robot 100 may determine motion planning using filtered successful grasp patterns provided by an external computing device. Components and methodologies of the manipulation planning module are described in detail below.

Figure 3A:
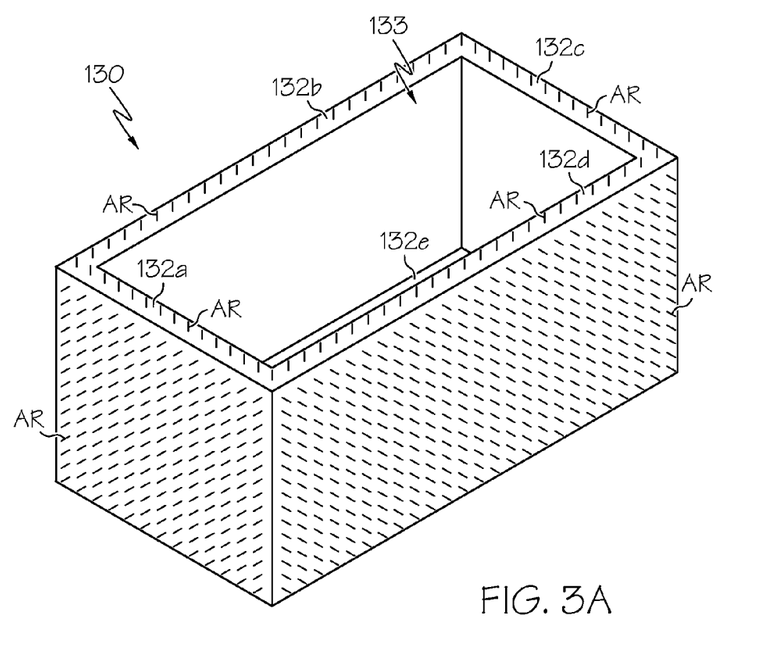
FIG. 3A depicts a schematic illustration of a target object and a plurality of approach rays associated with the target object at an approach ray density according to one or more embodiments shown and described herein.

Referring now to FIGS. 3A-3D, a target object 130 having a plurality of approach rays associated therewith is depicted. Referring specifically to FIG. 3A, the target object 130 is configured as a box having five walls 232a-232e and an opening 233. It should be understood that the target object may be of any configuration, and embodiments are not limited to the target objects illustrated throughout the figures. As depicted in FIG. 3A, a plurality of approach rays AR are associated with the target object 130 according to a predetermined density. Each approach ray AR extends perpendicularly from a surface of the target object 130. It is noted that only a few selected approach rays AR are labeled in FIGS. 3A-3D for ease of illustration.

Figure 3B:
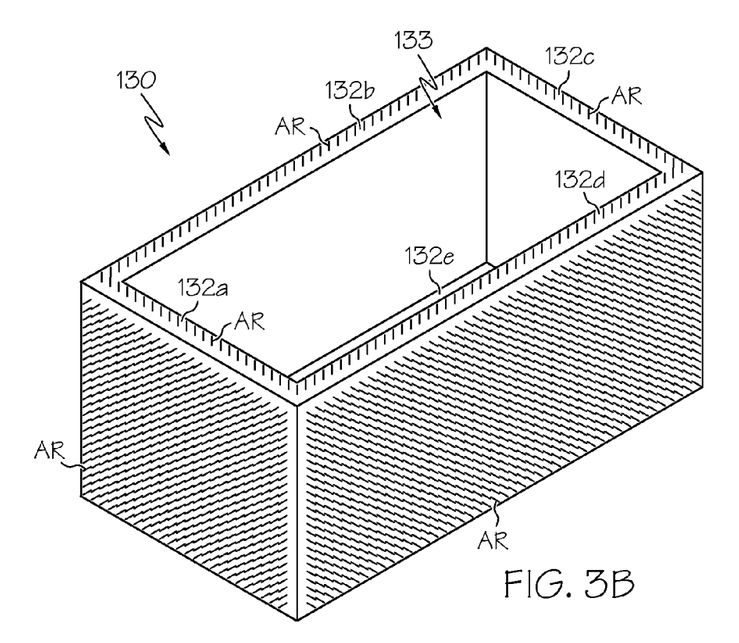
FIG. 3B depicts a schematic illustration of the target object depicted in FIG. 3A and a plurality of approach rays associated with the target object at another approach ray density according to one or more embodiments shown and described herein.

An approach ray AR corresponds to a path of travel that the robot will traverse when approaching the target object. As described in more detail below, a single approach ray AR may have several grasp patterns associated with it. A user (e.g., a robot programmer, a robot designer, a robot operator, etc.) may change the density and the location of the approach rays AR by changing one or more settings in a user interface that is used to interact with the manipulation planning module. In this manner, users may vary the resolution of the plurality of approach rays AR about the target object. FIG. 3B depicts the same target object 130 as depicted in FIG. 3A but with a higher density of the approach rays AR. As an example and not a limitation, a user may wish to select the density setting as very small so that the grid defined by the plurality of approach rays AR is incident on a narrow object surface of the target object. However, generating a grasp pattern set based on a plurality of approach rays AR having a density that is too dense may be very time-consuming and inefficient as there may be similar successful grasp patterns analyzed during trajectory planning.

Figure 3C:
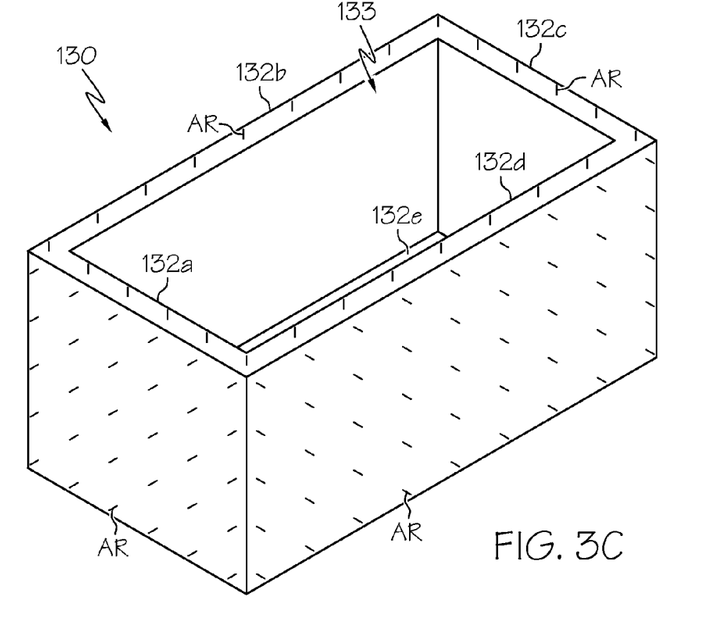
FIG. 3C depicts a schematic illustration of the target object depicted in FIG. 3A and a plurality of approach rays associated with the target object at another approach ray density according to one or more embodiments shown and described herein.
Figure 3D:
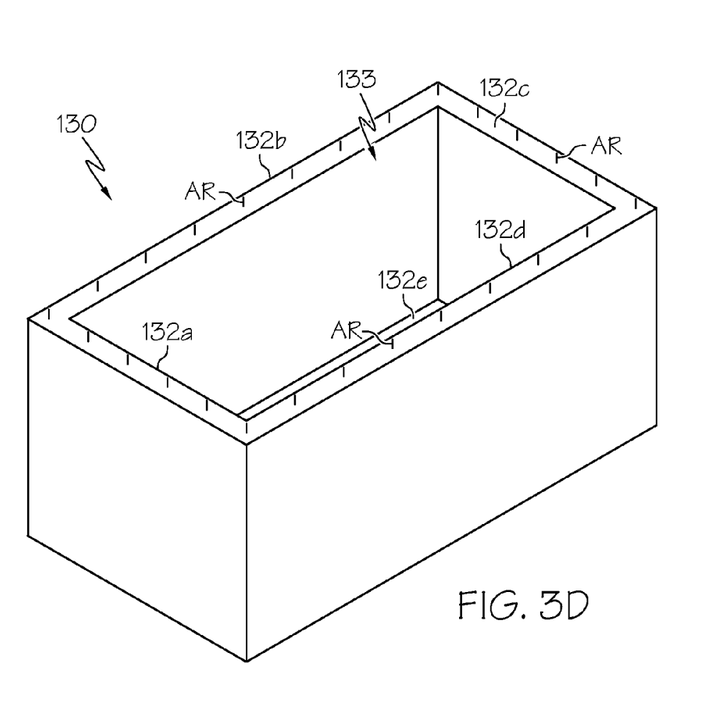
FIG. 3D depicts a schematic illustration of the target object and a plurality of approach rays associated with a top surface of the target object depicted in FIG. 3A according to one or more embodiments shown and described herein.

FIG. 3C depicts an approach ray density that is less than the approach ray densities of the target object depicted in FIGS. 3A and 3B. In one embodiment, a user may remove approach rays AR according certain criteria, such as approach rays having neighbors within a threshold distance may be removed. Additionally, a user may remove approach rays from a particular region or surface of the target object. FIG. 3D depicts the target object 130 wherein approach rays only extend from a top surface of walls 132a-132d. Accordingly, only grasp patterns that require the robot manipulator to approach the target object 130 from the top of the target object 130 will be considered when evaluating the grasp patterns. Use of automatic approach ray generation enables evaluation of many grasp patterns from a plurality of directions quickly and efficiently.

Figure 4:
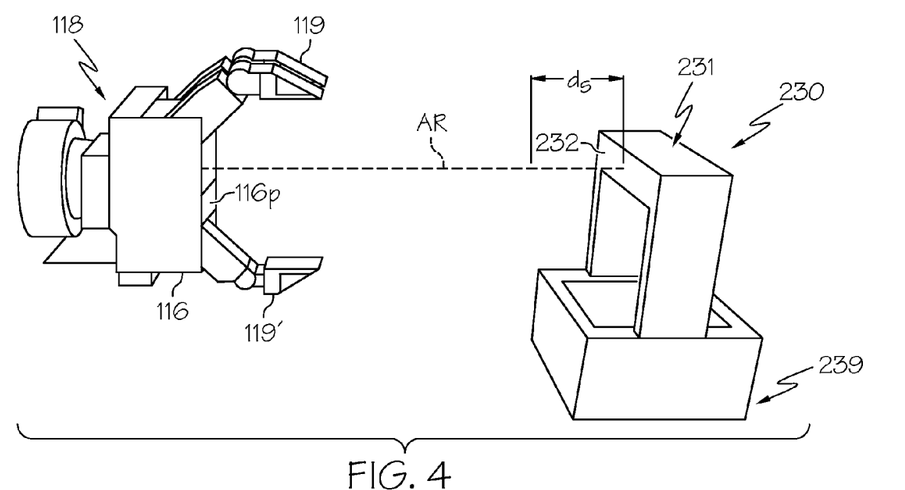
FIG. 4 depicts a schematic illustration of a robot hand and a target object in accordance with a grasping pattern according to one or more embodiments shown and described herein.

Referring now to FIG. 4, a schematic illustration of a robot end effector configured as a robot hand 118 approaching an exemplary target object 230 along a particular approach ray AR in accordance with an exemplary grasp pattern is provided. The robot hand 118 comprises two finger joints 119 and a thumb joint 119' that extend from a palm surface 116p of a hand portion 116. The exemplary target object includes a handle portion 231 and a base portion 239. The illustrated approach ray AR dictates that the illustrated grasp pattern will require that the robot attempt to grasp the handle portion 231 of the target object. It should be understood that only one approach ray AR is depicted in FIG. 4 for ease of illustration, and that the target object 230 may have a plurality of approach rays associated therewith.

Each individual grasp pattern of the grasp pattern set has a set of grasp parameters, which may include, but are not limited to, a pre-shape configuration of the end effector (i.e., robot hand) prior to grasping the target object, an approach ray AR of the plurality of approach rays, a standoff distance $d_s$, and a roll angle of the end effector.

The pre-shape configuration of the robot hand 118 is the initial finger/thumb joint 119/119' position before grasping the target object. For example, the pre-shape configuration of a particular grasp pattern may be that the finger joints 119 and the thumb joint 119' are in a fully open position. A plethora of pre-shape configurations are possible. Each grasp pattern has a single pre-shape configuration associated therewith.

As described above, each grasp pattern has a single approach ray AR. However, a single approach ray may have a plurality of grasp patterns associated therewith. The robot hand 118 (or other type of end effector) will approach the target object 230 by traversing a path dictated by the approach ray AR, commonly such that a central portion of the palm surface 116p is aligned with the approach ray AR.

The standoff distance $d_s$ is an offset distance from a surface 232 of the target object 230 where the robot hand 118 (or other type of end effector) stops approaching the target object 230. In some grasp patterns, the standoff distance $d_s$ may be zero such that the palm surface 116p contacts the target object 230. In other embodiments, the standoff distance $d_s$ may be a value such that the robot hand 118 stops prior to contacting the target object, as depicted in FIG. 4.

The roll angle is the pre-rotation angle of the robot hand 118 around the approach ray AR prior to reaching the target object. The robot hand 118 may be rotated by any angle about the approach ray AR.

Other parameters may also be considered, such as a friction coefficient of the finger joints 119 and the thumb joint 119', or an amount of force exerted onto the target object by the finger joints 119 and the thumb joint 119'.

One or more combinations of the above parameters may be sent to a grasp pattern set generation module (e.g., within the manipulation planning module 150) to generate a grasp pattern set comprising a plurality of individual grasp patterns. Each approach ray AR may have a plurality of associated grasp patterns. As an example and not a limitation, an approach ray AR may be associated with a first grasp pattern resulting from a first combination of the pre-shape configuration, standoff distance, and roll angle parameters, and a second grasp pattern resulting from a second combination of the pre-shape configuration, standoff distance, and roll angle parameters. In one embodiment, the number of grasp patterns within a grasp pattern set is equal to: (the number of pre-shape configurations)×(the number of standoff distances)×(the number of roll angles)×(the number of approach arrays).

As described below, each individual grasp pattern of the grasp pattern set is evaluated by computer simulation to filter out individual grasp sets that are unsuccessful as compared to one or more grasp metrics. The grasp pattern evaluation may be performed autonomously off-line for more efficient on-line manipulation (particularly object grasping) because no evaluation of the grasp quality of various available grasp patterns is required during the on-line processes.

Figure 5A:
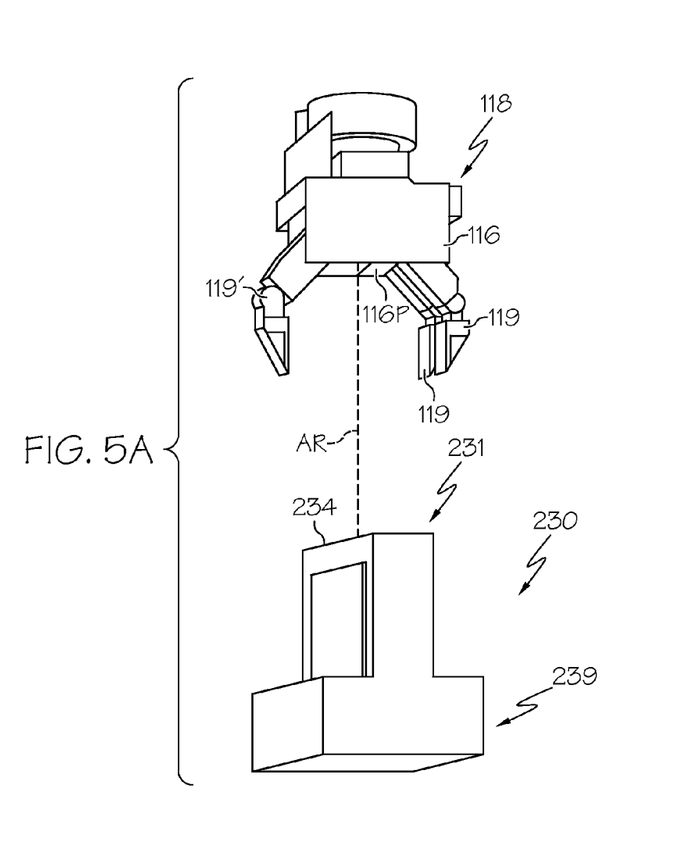
FIG. 5A depicts a schematic illustration of a robot hand located at an initial position of a grasp pattern and a target object according to one or more embodiments shown and described herein.

Each individual grasp pattern may be generated kinematically by computer simulation/calculation to determine whether or not the grasp of the individual grasp pattern is satisfactory. Referring to FIG. 5A, in one embodiment, the initial position and orientation of the robot hand coordinate system and initial finger joint angles are set before the computer simulation, which may be determined by the pre-shape configuration and roll angle parameters (as well as any other appropriate inputs or parameters). As shown in FIG. 5A, the approach ray AR of the illustrated grasp pattern dictates that the robot hand 118 will approach a top surface 234 of the handle portion 231 of the target object.

Figure 5B:
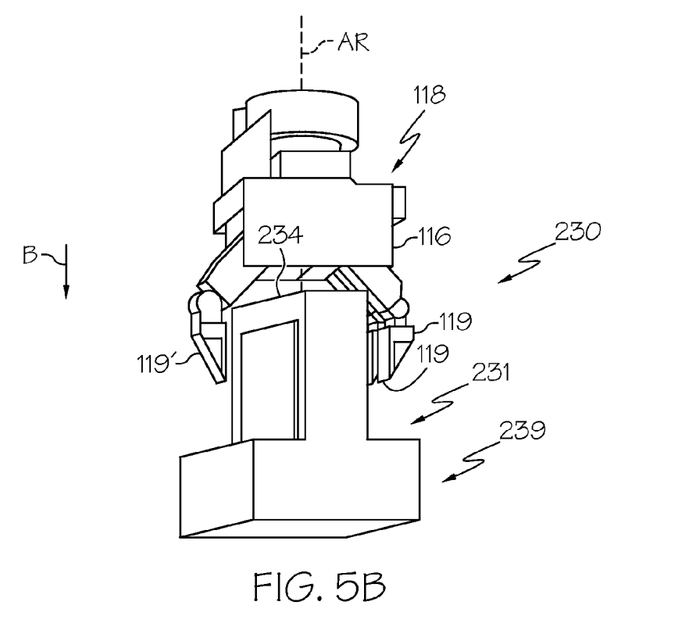
FIG. 5B depicts a schematic illustration of a robot hand approaching a target object in accordance with a grasp pattern according to one or more embodiments shown and described herein.
Figure 5C:
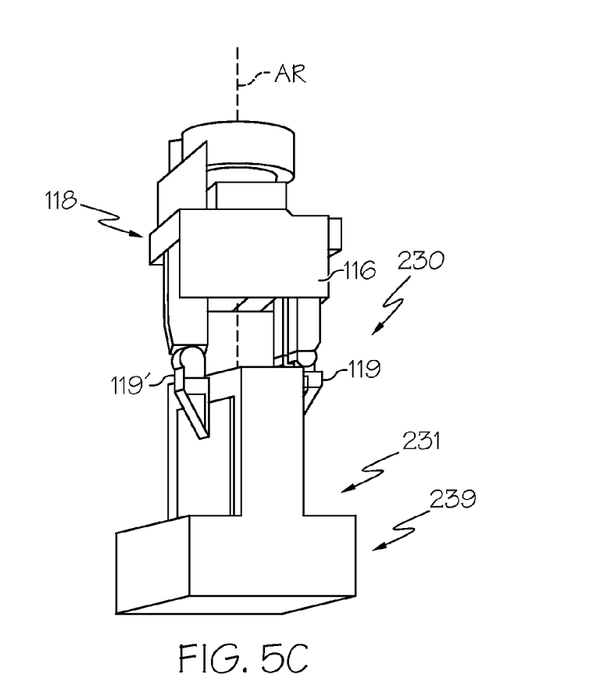
FIG. 5C depicts a schematic illustration of a robot hand grasping a target object in accordance with a grasp pattern according to one or more embodiments shown and described herein.

Next, the robot hand 118, by computer simulation, moves along a direction indicated by the approach ray AR until it contacts the target object or is at the standoff distance $d_s$. In many cases the robot hand 118 will approach the target object in a manner such that its motion is normal to its palm surface 116p, as shown by arrow B in FIG. 5B. Once the robot hand 118 is at the desired location, it may close its finger joints 119 and thumb joint 119' one by one or simultaneously until they contact the target object 230, as shown in FIG. 5C.

The contacts between the finger joints 119 and the thumb joint 119' with the target object are then extracted and used to measure a quality of the grasp. In one embodiment, a grasp quality score is generated, wherein the grasp quality score is a scalar value that indicates how securely the grasp associated with the individual grasp pattern can hold the target object. Any grasp evaluation calculation or methodology may be utilized to generate a grasp quality score. In one particular embodiment, a force-closure based measure is used as the grasp quality score for evaluating the grasp quality. A grasp may be considered a force-closure if it can resist a test force and torque without dropping the target object. The test force and torque that are applied to determine if a grasp is force-closure may depend on the target object.

Figure 6A:
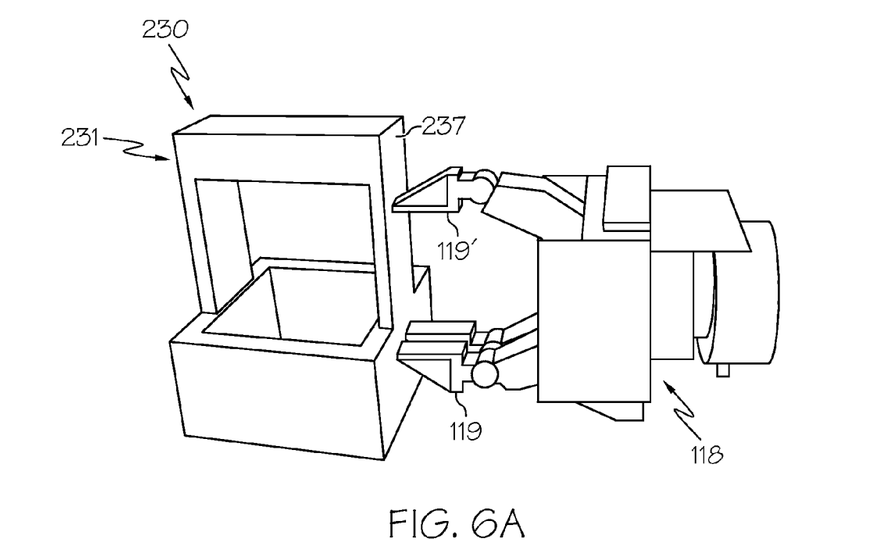
FIGS. 6A and 6B are schematic illustrations of unsuccessful grasp patterns according to one or more embodiments shown and described herein.
Figure 6B:
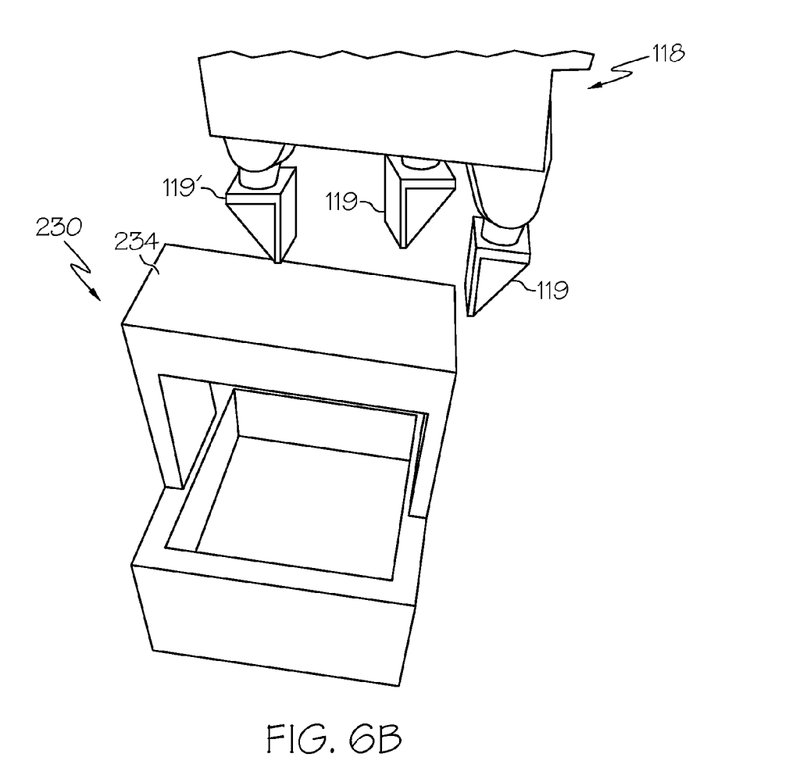
Figure 7:
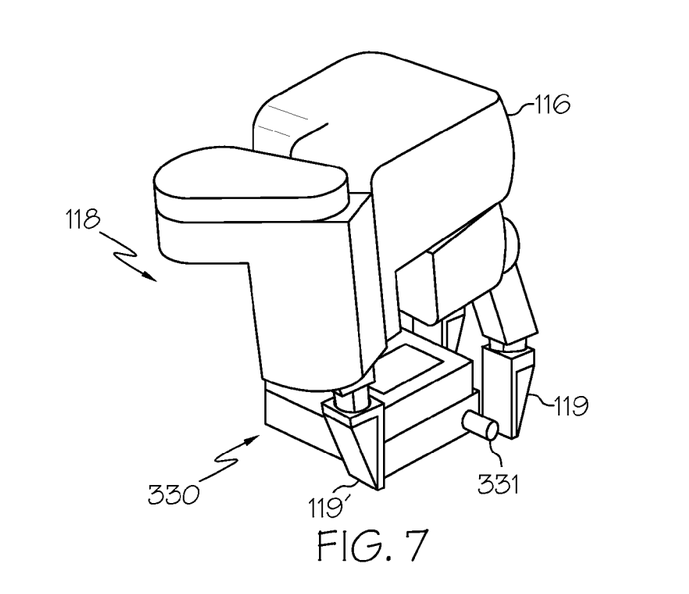
FIG. 7 depicts a schematic illustration of an unsuccessful grasp pattern of a robot hand attempting to grasp a cellular phone according to one or more embodiments shown and described herein.

The grasp quality score may then be compared with a grasp quality threshold associated with the particular target object. In one embodiment, only force-closure grasps will satisfy the grasp quality threshold. As an example and not a limitation, an individual grasp pattern wherein a finger joint does not contact the target object, or only partially contacts the target object, will have a low quality measure of the grasp. FIGS. 6A, 6B and 6C depict grasp patterns that lead to unsuccessful grasps. In FIG. 6A, the finger joints 119 and thumb joint 119' strike a side surface 237 of the handle portion 231 of the target object 230 such that the robot hand 118 cannot grasp the target object 230. Similarly, as shown in FIG. 6B, one of the finger joints 119 and the thumb joint 119' strike a top surface 234 of the handle portion 231 of the target object 230. FIG. 7 depicts a robot hand 118 attempting to grasp a target object configured as a cellular phone 330 such that one of the finger joints contacts an antenna portion 331 of the cellular phone 330 without the thumb joint 119' making contact, which may lead to an unsuccessful grasp. In each of these cases, the grasp pattern associated with the grasps would be removed from the grasp pattern set. Only grasp patterns leading to force-closure grasps are provided to the robot for on-line object manipulation, according to some embodiments.

Each individual grasp pattern having a grasp quality score that is greater than the grasp quality threshold may be saved to a file, along with information regarding the individual grasp patterns. In one embodiment, each individual successful grasp pattern is finalized and saved to the file. Finalizing the grasp pattern may include, but is not limited to, saving the initial robot hand configuration before grasping (i.e., pre-shape configuration), transformation information, and the grasp quality score. The transformation information may include the relative position and orientation of the hand coordinate system with respect to the object coordinate system. The finalized individual grasp patterns may then be provided to the robot for target object manipulation (e.g., the manipulation planning module 150 may provide a file containing the finalized individual grasp patterns to the trajectory logic 145 for generation of motion segments to control the manipulator and the end effector). For example, the robot, when encountering a target object, may evaluate the provided grasp patterns when determining how to manipulate an object. As an example and not a limitation, the robot may chose the individual grasp pattern that is most closely aligned with the current position of its end effector and has the highest grasp quality score for manipulation of the target object.

In this manner, embodiments of the present disclosure filter out undesirable grasps (e.g., collision between the robot hand and the target object, non force-closure grasps, etc.), and may eliminate duplicate grasps.

Some embodiments of the present disclosure may account for uncertainties that exist when a robot attempts to grasp an object. For example, there may exist a level of uncertainty as to a target object's true pose from the robot's perspective using its vision system (e.g., a sensor based object localization system); there may be a disparity between an object's true pose and the pose detected by robot. Further, uncertainties resulting from the dynamics of an object when grasped by the robot may also be present. For example, there may be a fluctuation of a target object's pose and displacement during the grasping process.

Figure 8:
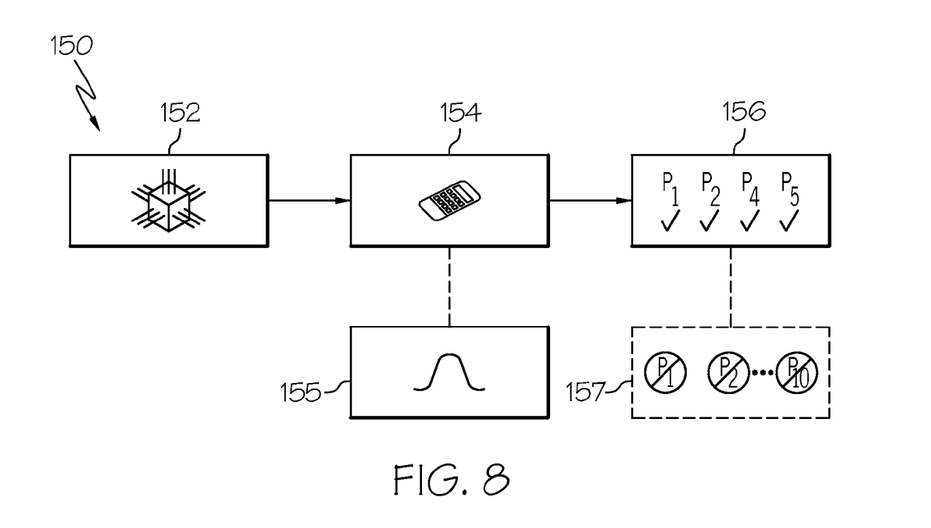
FIG. 8 depicts a schematic illustration of a manipulation planning module according to one or more embodiments shown and described herein.

FIG. 8 illustrates additional components of the manipulation planning module 150 according to one embodiment that provides for the inclusion of data uncertainty in estimating the grasp success rate, as well as for the incorporation of the dynamics of an object during the grasping process. At block 152, a plurality of approach arrays of a grasp pattern set is generated as described above. At block 154, the grasp quality score is calculated. In addition to the force-closure determination described above, the grasp quality score also considers the uncertainty of the target object's pose and dynamics during the grasping process via the probability distribution models of block 155, as described below. Successful individual grasp patterns are finalized and provided to the robot at block 156, while unsuccessful individual grasp patterns (e.g., non force-closure grasps, grasps that lead to significant target object slippage or displacement, and the like) are removed from the grasp pattern set, as shown in block 157. Generally, embodiments may utilize probability distribution models to account for uncertainties regarding: 1) an uncertainty as to a target object's initial pose (e.g., a pose probability distribution model); 2) an uncertainty as to an object's pose after being gripped by the robot (e.g., a reference pose probability distribution model); and 3) an uncertainty as to an objects pose or displacement after being lifted by the robot (e.g., a displacement probability distribution model).

Figure 9A:
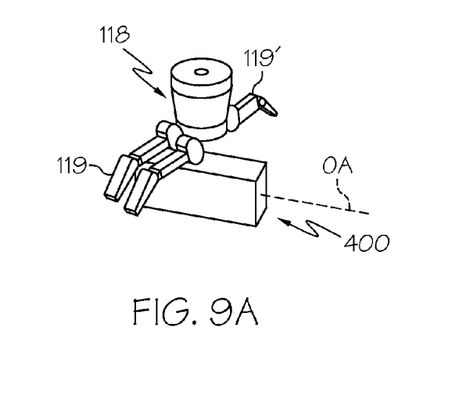
FIGS. 9A-9E are schematic illustrations of a robot hand grasping and lifting a target object according to one or more embodiments shown and described herein.
Figure 9B:
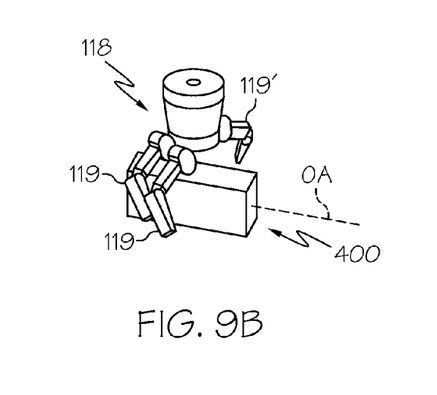

Referring now to FIGS. 9A-9E, the grasping and lifting of a target object 400 by a robot hand 118 wherein the target object 400 is displaced is schematically illustrated. Referring initially to FIG. 9A, an uncertainty as to the actual pose of the target object 400 may be present. FIG. 9A illustrates an actual pose of the target object 400 defined by object axis OA. However, the initial pose of the target object 400 as detected by the robot may be slightly different than that illustrated in FIG. 9A. To account for this uncertainty, the manipulation planning module 150 may access a pose probability distribution model (e.g., as illustrated in block 155) to select a plurality of object poses. The probability distribution models described herein may be configured as any appropriate probability distribution model wherein the manipulation planning module 150 may select several object poses or movements from a plurality of likely object poses or movements. For example, in one embodiment, the pose probability distribution model is configured as a Gaussian probability distribution module, wherein the object pose with the greatest probability is at the peak of the Gaussian probability distribution model. Other distribution models, such as a Bayesian distribution model, for example, may be utilized.

Figure 9C:
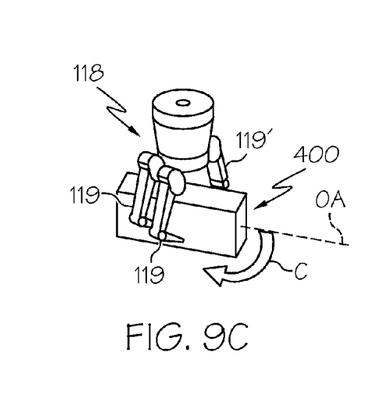
Figure 9D:
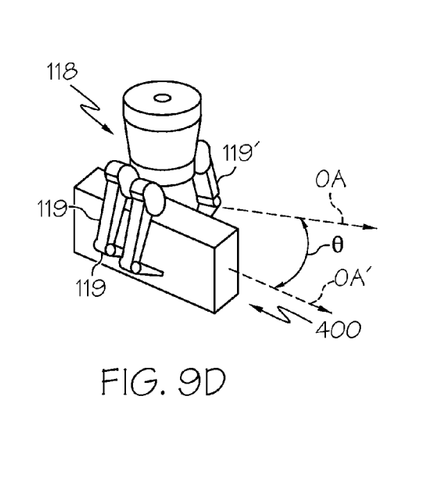

As described above, the robot hand 118 is moved along an approach ray toward the target object 400 (FIG. 9B) by computer simulation. In FIG. 9C, the finger joints 119 and thumb joint 119' are closed about the target object 400. During the grasping process, the initial object pose of the target object 400 has changed as indicated by arrow C, resulting in a new object pose along new object axis OA'. FIG. 9D depicts that there is a displacement angle of $\theta$ between the original object axis OA and the new object axis OA'. The actual new object pose of the target object 400 may be uncertain. The manipulation planning module 150 may calculate the dynamic motion of the target object by equations of motion of the target object 400. In one embodiment, the calculation of the object pose resulting from grasping the target object 400 may also be based on a probability distribution model that incorporates the uncertainties as to the movement of the target object 400 (e.g., a reference pose probability distribution model).

Figure 9E:
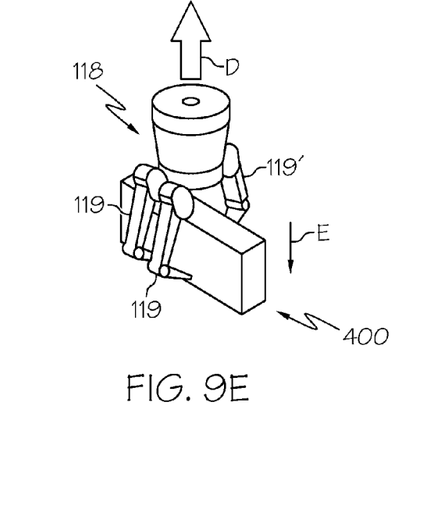

Next, the robot hand 118 lifts the target object 400 by computer simulation as indicated by arrow D, and the manipulation planning module 150 calculates a relative object pose of the target object 400 resulting from the dynamics of lifting the target object 400 by the robot hand 118. The manipulation planning module 150 may also calculate a displacement of the target object 400 resulting from the lifting motion of the robot hand 118. For example, the target object 400 may slip with respect to the robot hand 118 as it is lifted, as indicated by arrow E.

A grasp quality score for each grasp pattern of the grasp pattern set may be based on several computations resulting from the sampling of one or more probability distribution models. Embodiments may also calculate the grasp quality score by comparing the pose of the target object 400 after being grasped by the robot hand 118 (i.e., a reference object pose, as shown in FIG. 9D) with the pose of the target object 400 after being lifted by the robot hand 118 (i.e., the relative object pose, as shown in FIG. 9E).

More specifically, to evaluate the quality of a single grasp resulting from a single, individual grasp pattern, multiple computations with slightly different object pose and/or displacement obtained by sampling from one or more probability distribution models are executed, so that the uncertainty of object pose and displacement may be considered. In one embodiment, multiple preliminary grasp quality scores are calculated for each sampling (or combinations of samplings) of one or more probability models corresponding to either the initial pose of the target object, or the displacement of the target object 400 during grasping or lifting. The same probability distribution model may be used for each of these purposes, or a probability distribution model for each purpose may be used. At each computation of the target object manipulation, a preliminary grasp score is generated, and the preliminary grasp score of all of the computations are averaged to determine a final grasp quality score for the particular grasp pattern.

For example, a preliminary grasp score may be generated for each initial object pose selected from the pose probability distribution model. Some of the initial object poses may lead to a force-closure grasp while some may not. Additionally, a preliminary grasp score may also be calculated for each reference object pose of the target object 400 after being grasped by the robot hand 118, and/or each relative object pose of the target object 400 after being lifted by the robot hand 118.

According to one embodiment, the following conditional logic may be applied to judge a grasp pattern as successful or unsuccessful. For each computation based on sampling from one or more probability distribution models as described above, if the target object 400 under test is out of the robot hand 118 (i.e., the robot hand 118 drops the object), or if the robot hand 118 makes contact with the target object 400 with less than two joints at the conclusion of the lift-up stage (FIG. 9E), then a minimum grasp quality score (e.g., zero (0)) may be assigned to the preliminary grasp score of the particular computation associated with the grasp pattern. On the other hand, if the displacement of the target object 400 with respect to the robot hand 118 after the lift-up stage is approximately zero, and if the robot the number of joints 119 in contact with the target object 400 after lifting the target object 400 with the robot hand 118 is greater than or equal to the predetermined contact threshold (e.g., three joints), a maximum score (e.g., one (1.0)) may be assigned to the preliminary grasp score of the particular computation associated with the grasp pattern. A median score (e.g., 0.5) may be applied to the preliminary grasp score of the particular computation associated with the grasp pattern when the number of joints 119 in contact with the target object 400 after lifting the target object 400 with the robot hand 118 is greater than or equal to the predetermined contact threshold (e.g., three joints), and the displacement of the target object 400 with respect to the robot hand 118 after lifting the target object 400 with the robot hand 118 is greater than zero and less than a predetermined displacement threshold. The preliminary grasp quality scores for the particular grasp pattern may then be averaged together and used as the grasp quality score.

In addition to the conditional logic described above, embodiments may also consider the displacement or movement of the target object under test as it is lifted during the lift-up stage. For example, a reference object pose of the target object 400 may be determined after the target object 400 is grasped by the robot hand 118 and before it is lifted (see FIG. 9D). A relative object pose of the target object 400 may also be determined after the target object 400 is lifted by the robot hand (see FIG. 9E).

Movement of the target object resulting from the lift-up stage may be calculated or otherwise determined by comparing the relative object pose to the reference object pose. For example, the maximum deviation of the relative object pose from the reference object pose during the lift-up stage may be determined. In one embodiment, if the target object 400 under test moves a significant amount during the lift-up stage, the grasp may be considered unstable, and a low grasp quality score may be given. Conversely, if there is very little movement of the target object 400 during the lift-up stage, then the grasp may be considered stable, and a highest available grasp quality score (e.g., a score of one (1.0)) may be assigned.

In one embodiment, the deviations in object position (i.e., object displacement), as determined by a relative center of mass position of the target object, and an orientation of the target object, such as object pose, are considered separately. The deviations in object position ($\delta_P$) and object orientation ($\delta_R$) may be computed by the following equations:

$$\delta_P = \|p_{com} - \bar{p}_{com}\|, \quad \text{Eq. (1);}$$

$$\delta_R = \|\text{Log}(\bar{R}^T R)\|, \quad \text{Eq. (2);}$$

where $p_{com}$ and $R$ denote the relative center of mass position and the orientation of the target object 400 with respect to the robot hand 118, respectively. The bar on top of these parameters represents the reference values.

A grasp quality score, q, may be obtained from the maximum deviation $\delta^{MAX}$ of these calculations and a tolerance limit L:

$$q = 1 - \frac{\delta^{MAX}}{L}; (0 \le q \le 1), \text{ when } \delta^{MAX} > L.$$

If the maximum deviation for the object position or the orientation exceeds the tolerance limit, a grasp quality score of zero (0) may be given. The quality metric may be computed separately for object position and orientation and used as such, or these metrics may be combined (e.g., by averaging).

Each of the grasp quality scores described herein may be used separately, or combined to determine the final grasp quality score. As described above, individual grasp patterns of the grasp pattern set that are below a grasp quality threshold may be removed from the grasp pattern set and not provided to the robot. In this manner, the robot will only have access to successful, stable grasp patterns during on-line processes.

It should now be understood that embodiments described herein generate grasp patterns for use by a robot by generating a plurality of approach rays associated with a target object to the grasped by the robot. The density of the approach rays associated with the target object may be adjusted. Further, approach rays may be removed from particular surfaces of the target object, if desired. One or more grasp patterns are then associated with each approach ray and are evaluated by determining a grasp quality score. In some embodiments, a force-closure method is used to determine the grasp quality score. In some embodiments, probability distribution models are sampled to account for uncertainties due to object pose as well as the dynamics of the target object during grasping and lifting of the target object. In this manner, embodiments provide for a manipulation planner wherein a grasp pattern set is generated and evaluated off-line autonomously. Grasp pattern outputs are saved for use by the robot in trajectory planning for manipulation tasks. Accordingly, the complex grasp planning problem is converted into a static range searching problem, i.e., finding an appropriate grasp pattern from the plurality of successful grasp patterns.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A method for generating grasp patterns for use by a robot, the method comprising:
generating, using a processor, a plurality of approach rays associated with a target object, wherein each approach ray of the plurality of approach rays extends perpendicularly from a surface of the target object;
generating, using the processor, at least one grasp pattern for each approach ray of the plurality of approach rays to generate a grasp pattern set of the target object associated with the plurality of approach rays;

calculating a grasp quality score for each individual grasp pattern of the grasp pattern set;

comparing the grasp quality score of each individual grasp pattern with a grasp quality threshold;

selecting individual grasp patterns of the grasp pattern set having an individual grasp quality score that is greater than the grasp quality threshold;

providing the selected individual grasp patterns to the robot; and manipulating the target object by the robot based on at least one selected individual grasp pattern of the plurality of selected individual grasp patterns.

2. The method of claim 1, wherein each individual approach ray is associated with more than one grasp pattern.

3. The method of claim 1, wherein the plurality of approach rays is generated in accordance with a density setting.

4. The method of claim 1, wherein individual grasp patterns of the grasp pattern set are generated by computer simulation.

5. The method of claim 1, wherein each individual grasp pattern comprises a pre-shape configuration of a robot hand of the robot, and a transformation of the robot hand with respect to the target object.

6. The method of claim 1, wherein each individual grasp pattern is based at least in part on a pre-shape configuration of a robot hand prior to a grasping motion, an individual approach ray associated with the individual grasp pattern, a standoff distance of the robot hand toward the target object, and a roll angle of the robot hand prior to the grasping motion.

7. The method of claim 6, wherein each individual grasp pattern of the grasp pattern set is generated by:

by computer simulation, determining an initial position and an orientation of a robot hand coordinate system associated with the robot hand in accordance with the standoff distance and the roll angle according to the pre-shape configuration;

opening finger joints of the robot hand;

translating the robot hand along a selected approach ray of the plurality of approach rays until the robot hand is positioned at a predetermined distance from the target object, wherein the selected approach ray is associated with the individual grasp pattern;

closing the finger joints of the robot hand about the target object; and determining a contact force between the finger joints of the robot hand and the target object.

8. The method of claim 7, further comprising determining whether each individual grasp pattern is a force-closure grasp based on the contact force between the finger joints of the robot hand and the target object, wherein the grasp quality score is based at least in part on the contact force.

9. The method of claim 7, further comprising, for each individual grasp pattern:

selecting a plurality of object poses for the target object from a pose probability distribution model;

for each selected object pose of the plurality of object poses:

by computer simulation, grasping the target object with the finger joints of the robot hand;

lifting the target object with the robot hand;

determining a number of finger joints in contact with the target object after lifting the target object with the robot hand;

determining a displacement of the target object with respect to the robot hand after lifting the target object with the robot hand; and calculating a preliminary grasp quality score for each individual object pose of the plurality of object poses, wherein the preliminary grasp quality score is further based at least in part on the displacement of the target object with respect to the robot hand after lifting the target object with the robot hand; and determining the grasp quality score by averaging the preliminary grasp quality scores.

10. The method of claim 9, wherein the preliminary grasp quality score is determined at least in part by:

assigning a minimum score to an individual preliminary grasp quality score when the number of finger joints in contact with the target object after lifting the target object with the robot hand is less than a predetermined contact threshold;

assigning a median score to the individual preliminary grasp quality score when the number of finger joints in contact with the target object after lifting the target object with the robot hand is greater than or equal to the predetermined contact threshold, and the displacement of the target object with respect to the robot hand after lifting the target object with the robot hand is greater than zero and less than a predetermined displacement threshold;

assigning a maximum score to the individual preliminary grasp quality score when the number of finger joints in contact with the target object after lifting the target object with the robot hand is greater than or equal to the predetermined contact threshold, and the displacement of the target object with respect to the robot hand after lifting the target object with the robot is approximately equal to zero.

11. The method of claim 9, wherein the displacement of the target object with respect to the robot hand after lifting the target object is based on a displacement probability distribution model.

12. The method of claim 9, further comprising, for each selected object pose:

determining a reference object pose of the target object after grasping the target object with the finger joints of the robot hand by sampling the pose probability distribution model;

determining a relative object pose of the target object after lifting the target object with the robot hand by sampling the pose probability distribution model; and calculating a movement of the target object based at least in part on the relative object pose and the reference object pose, wherein the preliminary grasp quality score is based at least in part on the movement of the target object.

13. The method of claim 12, wherein the reference object pose and the relative object pose are based at least in part on a relative center of mass position of the target object and an orientation of the target object.

14. The method of claim 1, further comprising, for each individual grasp pattern:

calculating a plurality of preliminary grasp quality scores by sampling a probability distribution module for a plurality of computer simulations; and determining the grasp quality score by averaging the preliminary grasp quality scores.

15. The method of claim 1, wherein the grasp quality score is calculated at least by:

by computer simulation, closing finger joints of a robot hand of the robot about the target object;

determining a reference object pose of the target object after grasping the target object with the finger joints of the robot hand by sampling a pose probability distribution model;

lifting the target object with the robot hand;

determining a relative object pose of the target object after lifting the target object with the robot hand; and calculating a movement of the target object based at least in part on the relative object pose and the reference object pose, wherein the grasp quality score is based at least in part on the movement of the target object.

16. A computer program product for use with a computing device to generate robot grasp patterns, the computer program product comprising:

a non-transitory computer-readable medium storing computer-executable instructions for generating grasp patterns that, when executed by the computing device, cause the computing device to:

by computer simulation, using a processor, generate a plurality of approach rays associated with a target object, wherein each approach ray of the plurality of approach rays extends perpendicularly from a surface of the target object;

generate at least one grasp pattern for each approach ray of the plurality of approach rays to generate a grasp pattern set of the target object associated with the plurality of approach rays;

calculate a grasp quality score for each individual grasp pattern of the grasp pattern set;

compare the grasp quality score of each individual grasp pattern with a grasp quality threshold;

select individual grasp patterns of the grasp pattern set having an individual grasp quality score that is greater than the grasp quality threshold;

provide the selected individual grasp patterns to the robot; and manipulating the target object by the robot based on at least one selected individual grasp pattern of the plurality of selected individual grasp patterns.

17. The computer program product of claim 16, wherein the plurality of approach rays is generated in accordance with a density setting, and each individual approach ray is associated with more than one grasp pattern.

18. The computer program product of claim 16, wherein:

each individual grasp pattern is based at least in part on a pre-shape configuration of a robot hand of the robot prior to a grasping motion, an individual approach ray associated with the individual grasp pattern, a standoff distance of the robot hand toward the target object, and a roll angle of the robot hand prior to the grasping motion, wherein the robot hand comprises finger joints; and the computer-executable instructions further cause the computing device to perform the following for each individual grasp pattern of the grasp pattern set:

determine an initial position and orientation of a robot hand coordinate system associated with the robot hand in accordance with the standoff distance and the roll angle;

open the finger joints of the robot hand according to the pre-shape configuration;

translate the robot hand along a selected approach ray of the plurality of approach rays until the robot hand is positioned at a predetermined distance from the target object, wherein the selected approach ray is associated with the individual grasp pattern;

close the finger joints of the robot hand about the target object; and determine a contact force between the finger joints of the robot hand and the target object.

19. The computer program product of claim 18, wherein the computer-executable instructions further cause the computing device to perform the following for each individual grasp pattern of the grasp pattern set:

select a plurality of object poses for the target object from a pose probability distribution model;

for each selected object pose:

grasp the target object with the finger joints of the robot hand;

lift the target object with the robot hand;

determine a number of finger joints in contact with the target object after lifting the target object with the robot hand;

determine a displacement of the target object with respect to the robot hand after lifting the target object with the robot hand; and calculate a preliminary grasp quality score for each individual object pose of the plurality of object poses, wherein the preliminary grasp quality score is based at least in part on the displacement of the target object with respect to the robot hand after lifting the target object with the robot hand; and determining the grasp quality score by averaging the preliminary grasp quality scores.

20. A method for generating grasp patterns for use by a robot comprising a robot hand having finger joints, the method comprising:

generating, using a processor, a plurality of approach rays associated with a target object, wherein each approach ray of the plurality of approach rays extend perpendicularly from a surface of the target object;

generating, using the processor, at least one grasp pattern for each approach ray of the plurality of approach rays to generate a grasp pattern set of the target object associated with the plurality of approach rays, wherein each individual grasp pattern is generated at least in part by:

selecting a plurality of object poses for the target object from a pose probability distribution model; and for each selected object pose:

by computer simulation, grasping the target object with the finger joints of the robot hand;

lifting the target object with the robot hand;

determining a number of finger joints in contact with the target object after lifting the target object with the robot hand;

determining a displacement of the target object with respect to the robot hand after lifting the target object with the robot hand;

determining a contact force between the finger joints of the robot hand and the target object; and calculating a preliminary grasp quality score for each individual object pose of the plurality of object poses, wherein the preliminary grasp quality score is based at least in part on the displacement of the target object with respect to the robot hand after lifting the target object with the robot hand and the contact force between the finger joints of the robot hand and the target object;

calculating a grasp quality score for each individual grasp pattern of the grasp pattern set by averaging the preliminary grasp quality score of the plurality of object poses associated with each individual grasp pattern;

comparing the grasp quality score of each individual grasp pattern with a grasp quality threshold;

selecting individual grasp patterns of the grasp pattern set having an individual grasp quality score that is greater than the grasp quality threshold; and providing the selected individual grasp patterns to the robot; and manipulating the target object by the robot based on at least one selected individual grasp pattern of the plurality of selected individual grasp patterns.

\* \* \* \* \*